US010063093B2

(12) United States Patent
Beekmann

(10) Patent No.: US 10,063,093 B2
(45) Date of Patent: Aug. 28, 2018

(54) METHOD FOR THE CONTROL OF A WIND TURBINE WITH NO MAINS SUPPORT AVAILABLE

(71) Applicant: Wobben Properties GmbH, Aurich (DE)

(72) Inventor: Alfred Beekmann, Wiesmoor (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 14/385,396

(22) PCT Filed: Mar. 1, 2013

(86) PCT No.: PCT/EP2013/054179
§ 371 (c)(1),
(2) Date: Sep. 15, 2014

(87) PCT Pub. No.: WO2013/135504
PCT Pub. Date: Sep. 19, 2013

(65) Prior Publication Data
US 2015/0042094 A1 Feb. 12, 2015

(30) Foreign Application Priority Data
Mar. 16, 2012 (DE) .................. 10 2012 204 239

(51) Int. Cl.
*H02J 11/00* (2006.01)
*F03D 7/00* (2006.01)
(Continued)

(52) U.S. Cl.
CPC .............. *H02J 11/00* (2013.01); *F03D 7/026* (2013.01); *F03D 7/0284* (2013.01); *H02P 9/08* (2013.01);
(Continued)

(58) Field of Classification Search
CPC .... F03D 7/026; F03D 7/0284; F05B 2260/85; F05B 2270/1033; H02J 11/00; H02P 9/08; Y02E 10/723
See application file for complete search history.

(56) References Cited

U.S. PATENT DOCUMENTS 5,852,331 A * 12/1998 Giorgini .................. F03D 1/04
290/44
7,098,550 B2 * 8/2006 Wobben .................. H02J 3/386
290/44
(Continued)

FOREIGN PATENT DOCUMENTS

CL          43968         9/2008
DE    10 2007 054 215 A1   5/2009
(Continued)

*Primary Examiner* — Tulsidas C Patel
*Assistant Examiner* — S. Mikailoff
(74) *Attorney, Agent, or Firm* — Seed IP Law Group LLP

(57) ABSTRACT

The invention relates to a method for controlling a wind turbine that comprises a generator, is provided to feed electrical power into an electricity supply grid but has not yet been connected to the electricity supply grid, comprising the steps: generating electrical power using the generator and supplying electrical elements of the wind turbine with the power generated, and to a wind turbine for generating electrical power from the wind and for feeding the electrical power generated into an electricity supply grid, wherein a method according to one of the preceding claims is carried out.

8 Claims, 3 Drawing Sheets

(51) Int. Cl.
*F03D 7/02* (2006.01)
*H02P 9/08* (2006.01)

(52) U.S. Cl.
CPC ... *F05B 2260/85* (2013.01); *F05B 2270/1033* (2013.01); *Y02E 10/721* (2013.01); *Y02E 10/723* (2013.01)

(56) References Cited

U.S. PATENT DOCUMENTS

| | | | |
|---|---|---|---|
| 7,394,166 B2 | 7/2008 | Teichmann et al. | |
| 8,390,140 B2 | 3/2013 | Bolln et al. | |
| 2004/0178638 A1* | 9/2004 | Wobben | H02J 3/386 290/44 |
| 2007/0246943 A1* | 10/2007 | Chang | F03D 9/021 290/44 |
| 2008/0084070 A1* | 4/2008 | Teichmann | H02J 3/38 290/55 |
| 2009/0230689 A1* | 9/2009 | Burra | F03D 9/003 290/55 |
| 2010/0013224 A1* | 1/2010 | Edenfeld | F03D 7/0224 290/44 |
| 2010/0066088 A1 | 3/2010 | Matsushita | |
| 2010/0295304 A1* | 11/2010 | Rowan | F03D 7/0224 290/44 |
| 2011/0018269 A1* | 1/2011 | Moser | F03D 7/0204 290/44 |
| 2011/0031761 A1* | 2/2011 | DeAngeles | F03D 7/0224 290/55 |
| 2011/0187119 A1* | 8/2011 | McMaster | F03D 9/02 290/55 |
| 2011/0221193 A1* | 9/2011 | Kalen | F03D 7/0212 290/44 |
| 2012/0009066 A1 | 1/2012 | Vilbrandt et al. | |
| 2012/0056425 A1 | 3/2012 | Cousineau | |
| 2012/0261917 A1* | 10/2012 | Egedal | F03D 7/026 290/44 |
| 2012/0286509 A1 | 11/2012 | Rafoth | |
| 2016/0169199 A1 | 6/2016 | Beekmann et al. | |

FOREIGN PATENT DOCUMENTS

| | | |
|---|---|---|
| DE | 10 2009 027 981 A1 | 1/2011 |
| EP | 1 961 957 A2 | 8/2008 |
| EP | 2 565 443 A1 | 3/2013 |
| EP | 2 589 799 A1 | 5/2013 |
| NZ | 316943 A | 11/1998 |
| RU | 2382900 C1 | 2/2010 |
| RU | 2444646 C1 | 3/2012 |
| WO | 97/09531 A1 | 3/1997 |
| WO | 2005/113964 A1 | 12/2005 |
| WO | 2005/116445 A1 | 12/2005 |
| WO | 2008/142947 A1 | 11/2008 |

* cited by examiner

METHOD FOR THE CONTROL OF A WIND TURBINE WITH NO MAINS SUPPORT AVAILABLE

BACKGROUND

1. Technical Field

The present invention relates to a method for controlling a wind turbine and to such a wind turbine.

2. Description of the Related Art

Wind turbines are commonly known and an example of a wind turbine is shown in FIG. 1. Such wind turbines are provided for converting energy from the wind into electrical energy and feeding it into an electricity supply grid, referred to hereafter also as an electricity grid or a grid.

Before the wind turbine can feed electrical power into the grid, it must however first be erected and connected to the grid. Once it has been substantially erected, functional tests are often carried out before the turbine can finally be connected to the grid and operated as part of it. During this time, the turbine, which may otherwise have already been completely erected, cannot be operated normally, and in general cannot be operated at all. Depending on where it is sited, there is a risk of the wind turbine cooling down and moisture, in particular from the air, being deposited. There is also a risk that the wind turbine is exposed to moisture from rain too. Although, once it has been erected, a wind turbine is often essentially provided with an enclosed nacelle and an enclosed mast, rain may nevertheless penetrate through ventilation holes, for example, through which it cannot penetrate when the turbine is running because of the flow of ventilation air flowing out. Unfavorable orientation of the wind turbine, in particular of a wind turbine nacelle, can also favor the penetration of rain.

In order to obviate this problem, such ventilation slits can be closed or sensitive turbine parts can be covered or shrouded. However, such measures entail a high cost and there is a risk that such covers or shrouds cannot be removed or cannot be removed completely when the turbine ultimately goes into operation. The erection as well as any functional tests are made harder.

Alternatively, in order to prevent damage from moisture that is deposited or penetrates, heating and/or air-drying can be provided using a corresponding device. Alternatively, attempts may simply be made to make the turbine ready and connect it to the grid as quickly as possible. Where possible, attempts may also be made to erect the turbine in less critical weather conditions but this is often impractical.

Sometimes wind turbines are completely erected and could be connected to the grid but this is not possible for the time being because the grid or a corresponding branch to the wind turbine does not exist yet. Approval for connection of the wind turbine or provision of a corresponding grid branch for the connection may be slow in coming through. In this case, it would be impossible or difficult to operate a heating device and/or drying device when there is no connection to the grid. Connection to the grid is namely often required not only for feeding electrical power from the wind turbine into the grid but also for providing electrical power from the grid for starting up the wind turbine and/or operating turbine equipment. When there is no connection to the grid, the wind turbine can thus not be operated and there is a risk, as described, of moisture being deposited or penetrating, which can sometimes very rapidly result in damage to parts of the turbine, in particular to electrical equipment of the turbine.

The German patent and trademark office has identified the following prior art in the priority application: US 2010/0013224 A1, US 2012/0056425 A1 and U.S. Pat. No. 7,394,166 B2.

BRIEF SUMMARY

One or more embodiments of the invention may address one or more of the problems mentioned. In one embodiment, a solution is provided that prevents or at least reduces moisture from penetrating or being deposited when a wind turbine has not yet been connected to an electricity supply grid. At least one alternative solution is also proposed.

According to one embodiment of the invention, a method is proposed. The method may begin with a wind turbine that has a generator that is provided for feeding electrical power into an electricity supply grid but has not yet been connected to the electricity supply grid. It is therefore proposed to generate electrical power using the generator and to use the electrical power generated to supply electrical elements of the wind turbine. In other words, the wind turbine is started up with the purpose of low power generation, just enough electrical power being generated to start up electrical elements of the wind turbine. Starting up the wind turbine in this way makes no sense in terms of generating and feeding electrical energy into the supply grid because there is not yet any connection to the grid. The wind turbine is operated solely for the reason and to the extent that the turbine does not become damaged by moisture. Put simply, after it has been erected but before connection to the grid, the wind turbine is thereby prevented from deteriorating.

In particular, the electrical elements that are supplied with electrical power are those which otherwise are at risk of receiving moisture and those which as a whole can protect the wind turbine from moisture penetrating or being deposited.

At least one control device for controlling the wind turbine is hereby preferably supplied with electrical power. In this respect, it is in principle possible to put into operation a control system that can control the further activation and starting-up of elements.

In addition and alternatively, an azimuth adjustment device for adjusting the orientation of the wind turbine relative to the wind is preferably supplied with electrical power and operated accordingly. Such an azimuth adjustment device is provided for so-called horizontal-axis wind turbines that are currently by far the most common type and an example of which is shown in FIG. 1. By virtue of the operation of this azimuth adjustment device, the latter is first of all started up and thus protected from the deposition or penetration of moisture. Moreover, the wind turbine can be oriented relative to the wind, which thus also corresponds to the usual orientation that can here also be optimal or at least advantageous in the case of rain. It is also expedient to orient the wind turbine relative to the wind when the wind turbine is intended to generate electrical power from the wind and even when only very little electrical power is generated.

A heating device for heating a part of the wind turbine is preferably put into operation. Such a heating device can, for example, be a nacelle heater that heats the nacelle, for example, when occupied by maintenance staff. The heating device can also be one that heats measuring instruments such as an anemometer in order to protect said instruments from icing up. It is consequently also possible to ensure proper measurement of the wind conditions, which in turn is expedient or even necessary to operate the wind turbine.

A heating device can, for example, also be provided in the rotor blades in order to protect the rotor blades from icing up or to deice the rotor blades. These rotor blade heating devices can then preferably also be operated when there is no need for deicing. Such heating devices for the rotor blades are characterized by having a relatively high energy requirement. This means in turn that a correspondingly large amount of power is required for this moisture protection operating mode. The moisture protection operating mode hereby refers to the operation of the wind turbine where the wind turbine does not feed power into the grid and is being operated purely for self-protection, i.e., protection from moisture that is deposited or penetrates. Therefore if the heating device for heating the rotor blades is used, there is a relatively high requirement for electrical power which in turn requires the wind turbine to generate a correspondingly high amount of power, which in turn entails that all elements that are also otherwise used in the regular operating mode, or at least many of the elements that are also used in the regular operating mode, fundamentally function in the same way as in the normal operating mode. If it is possible to allow as many elements of the wind turbine as possible to function in the normal operating mode or in a similar state, this automatically results in them being protected from moisture.

However, in such a moisture protection operating mode, an inverter required to feed power into the electricity supply grid would not automatically be in a normal operating state or a similar operating state when the wind turbine is not connected to the grid. It is therefore proposed, inter alia, that the inverter or inverters present are also supplied with electrical power. A dummy load, such as chopper resistors for example, can preferably be provided that activates the inverter. The inverter thus generates a current signal, albeit a low one, that is not fed into the grid but instead is used to activate such chopper resistors. The output current so generated is thus converted into heat. To do this, it can be advantageous that these chopper resistors are arranged at points in the wind turbine that have need of heating, in particular in this moisture protection operating mode. However, at the same time the operation of the inverters also causes the inverters themselves to generate heat losses and they can thus protect themselves against moisture. On the one hand, no or little moisture is deposited on elements of the inverters when these heat up during operation. On the other hand, the inverter can also cause fans in the inverters to start up, which also militate against the depositing of moisture or other types of moisture penetration. The chopper resistors can be a component of the inverters.

In order to be able to dissipate as much power as possible via the said chopper resistors, multiple chopper resistors or multiple banks of chopper resistors are used that are activated in turn so that the respective chopper resistors or banks of chopper resistors can cool down in the meantime in order to prevent them from overheating.

Such chopper resistors or banks of chopper resistors can in principle be activated differently than via the inverters. For example, an activating device for activating these chopper resistors or banks of chopper resistors can be provided that is present solely for this purpose. Chopper resistors or banks of chopper resistors can also be used that are provided as a safety device when the turbine is running, namely so that they can remove power that is still being generated in the case of a sudden shutdown of the wind turbine.

According to a further embodiment, it is proposed that checks are carried out at predeterminable checking intervals as to whether the generator and/or the wind turbine is operating and electrical power is being generated, wherein the generator or the wind turbine is started up when it is determined that either of them is not operating and is not generating any electrical power. It is in principle advantageous to operate the wind turbine generally also without a connection to the grid in the moisture protection operating mode described. It is thus possible that the wind abates long enough that power is no longer being generated any more. In this case, the wind turbine is initially stopped. In that regard, there is insufficient wind to maintain operation of the wind turbine. Such a situation is detected by the proposed checking system. The predeterminable checking intervals may, for example, be an hour, half an hour, or two hours or other values. The checking intervals can also be preset individually, such as for example depending on the installation site or depending on the time of year. If a wind turbine is sited in a warm, dry region in summer, when there is also little likelihood of rain, such checking intervals can be long. In contrast, if a wind turbine is sited in a cold and wet region and in particular at a cold and wet time of year, it may be advantageous to choose short checking intervals.

The wind turbines are preferably started up for the moisture protection operating mode with the aid of an auxiliary energy source, in particular having a battery and/or an auxiliary generator such as a diesel generator. This may relate both to the first start-up for this moisture protection operating mode or also to the start-up that is proposed according to an embodiment when a check is made after a predeterminable checking interval that the generator or the wind turbine is no longer operating and is no longer generating any power. Such an auxiliary energy source can be a mobile auxiliary energy source or an auxiliary energy source that is at least temporarily fixed. The latter is proposed especially when there is a likelihood that a connection to the grid will take a relatively long time. Such an auxiliary source can also remain in situ when the wind turbine is connected to a weak grid or to the grid via a weak grid link and correspondingly in the future too, i.e., even once the wind turbine has been connected to the grid but there is a likelihood of a relatively long disconnection from the grid.

It should be noted that checking whether the generator is still operating requires relatively little energy and can be performed, for example, using a conventional small battery or even a capacitor unit. The check itself essentially may only require energy to operate a small microprocessor or microcomputer. It is also possible to use a connection to the grid. It may thus be possible that the wind turbine is not yet connected to the grid, or also that it cannot be connected to the grid yet, but that a connection to the grid exists that is sufficient to perform the moisture protection operating mode and is at least sufficient for the check described. Only when a check results in the need to start up or start up again a moisture protection operating mode is significantly more energy and significantly more power required that can then be switched on via the auxiliary source. Alternatively or additionally, a check can be made as to whether there is sufficient wind. According to one embodiment, it is proposed that a moisture protection operating mode is induced depending on conditions inside or outside the wind turbine, such as, for example, moisture and/or temperature.

An emergency power unit can also be provided to monitor whether the wind turbine is operating.

It is preferably proposed that at least one of the electrical elements is supplied directly with electrical power by the auxiliary energy source when the generator of the wind turbine cannot be started up because there is a lack of wind. For example, to do this, a diesel generator may even be operated permanently when weather conditions make such moisture protection necessary.

It can also preferably be provided that the wind turbine runs essentially without any external source of energy. To this effect, the rotor blades can have a corresponding pitch that is approximately 60°, assuming the feathered position is 90°. This may also be referred to as self-starting.

According to another embodiment, it is proposed that, after a predeterminable period of time, the generator is switched off again and/or the supply to the electrical elements is interrupted again when there is insufficient wind for operating the generator. In particular, a trade-off is proposed between, on the one hand, the use of energy from an auxiliary energy source, in particular the use of a fuel, when for example a diesel generator or other combustion motor is used, and, on the other hand, the urgency of the moisture protection for the elements. Once the wind turbine has been successfully started, a diesel generator should be stopped again. It may, for example, also be advantageous in this trade-off only to employ auxiliary energy to turn the wind turbine into the wind so that at least one orientation according to a normal mode of turbine operation exists. In other words, it may be sufficient to orient the wind turbine for a certain period of time, such as for example half a day or a day, so that at least no rain enters the wind turbine. As a purely precautionary measure, it should be noted that there can also be a wind direction when the wind is so weak that the generator cannot be started up.

Moreover, a wind turbine for generating electrical power from the wind for feeding the electrical power generated into an electricity supply grid is proposed that is characterized in that a method according to one of the abovementioned embodiments is carried out. In particular, a wind turbine is proposed with a method for controlling the wind turbine in a described moisture protection operating mode. As described above, this wind turbine can also be protected from moisture when it is not yet connected to the electricity supply grid.

The wind turbine preferably comprises an auxiliary energy source, in particular a battery or an auxiliary generator. The auxiliary energy source here needs to be dimensioned such that it can provide sufficient power and sufficient energy too to start the wind turbine. Attention is drawn here in particular to the power and the energy. For example, a selected generator that is too small could provide sufficient energy, as long as the diesel tank is large enough, but without being able to provide sufficient power, i.e., sufficient energy per unit of time. Conversely, a bank of capacitors, for example, can provide sufficient power but it is not available for a sufficient period of time, during which the bank of capacitors has not stored sufficient energy.

It should additionally be noted that a wind turbine provided for operation with the grid is one that both has corresponding connections for connection to an electricity network and in particular comprises a corresponding inverter, including a corresponding program for activating the inverter that is provided for feeding power into an electricity supply grid. It should be noted here that today wind turbines that feed power into the electricity supply grid also need to comply with grid regulations that are usually referred to as the Grid Code. A wind turbine is only provided or prepared for connection to an electricity supply grid when it can meet such requirements. Whether a wind turbine is actually provided or prepared for connection to an electricity supply grid can ultimately be determined by whether it was finally connected to an electricity grid.

BRIEF DESCRIPTION OF THE SEVERAL VIEWS OF THE DRAWINGS

The invention is now explained in detail below by way of example with the aid of exemplary embodiments and with reference to the accompanying drawings.

DETAILED DESCRIPTION

Figure 1:
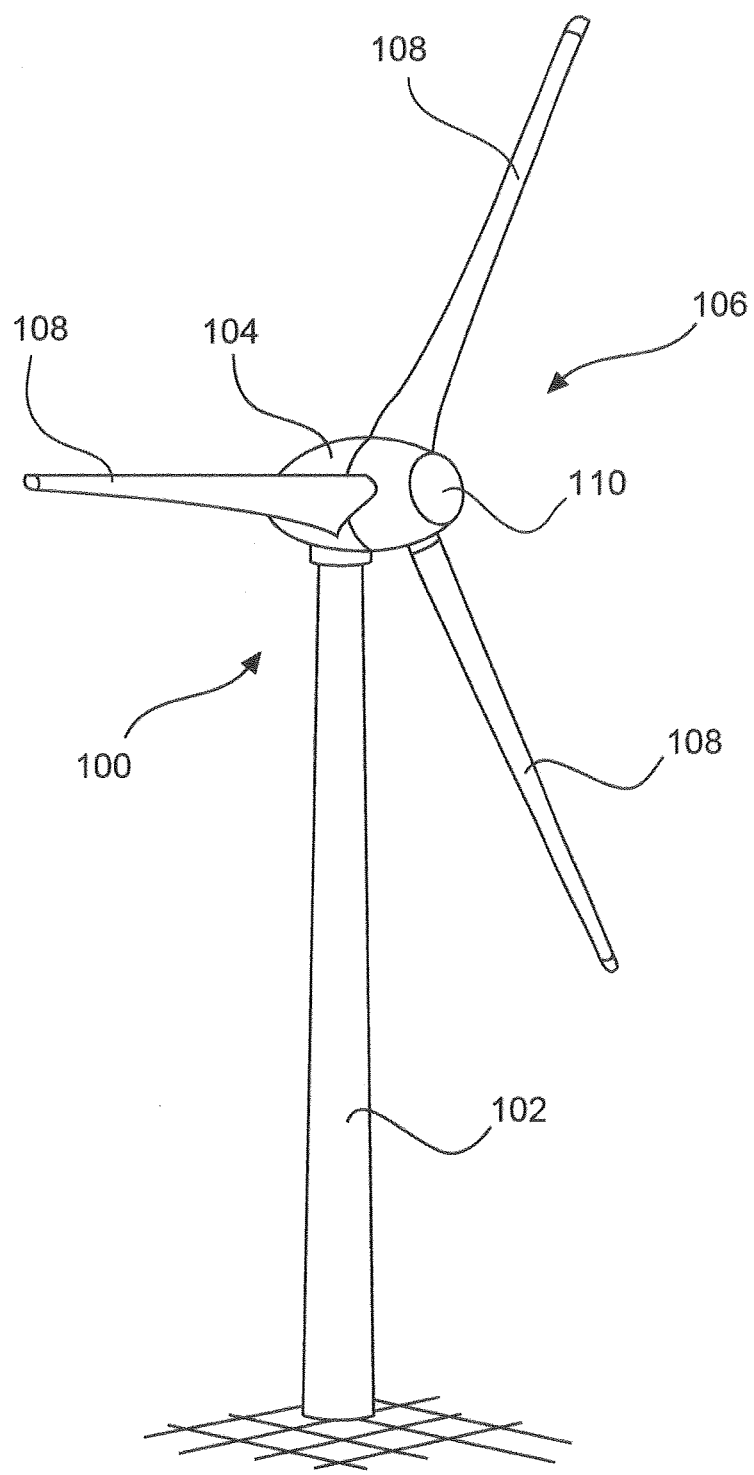
FIG. 1 shows a perspective view of a wind turbine.

FIG. 1 shows a wind turbine 100 having a mast 102 and a nacelle 104. A rotor 106 with three rotor blades 108 and a spinner 110 is arranged on the nacelle 104. During operation the rotor 106 is displaced by the wind in a rotational motion and thereby drives a generator inside the nacelle 104.

Figure 2:
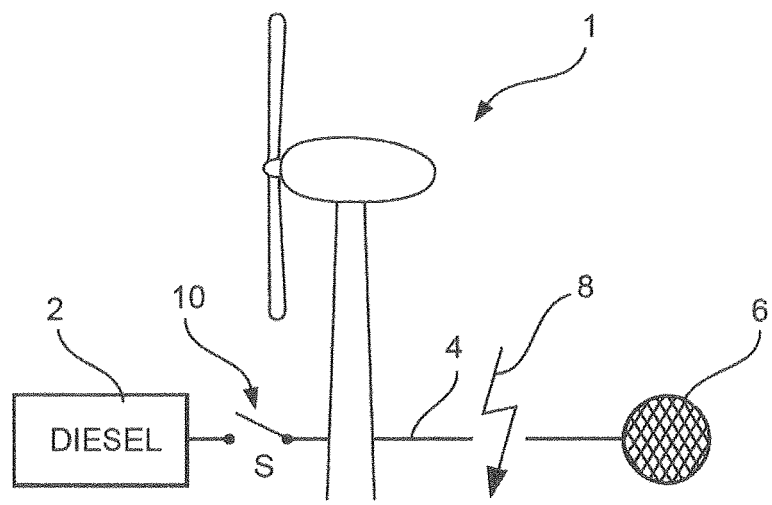
FIG. 2 shows schematically a wind turbine, with an auxiliary generator, that is disconnected from the grid.

FIG. 2 shows a wind turbine 1 with an auxiliary energy source 2 or an auxiliary generator 2, namely a diesel generator 2 as a possible embodiment of such an auxiliary energy source. The wind turbine 1 is in principle intended to be connected to an electricity supply grid 6 by a connection line 4. The illustrated situation, however, assumes that the wind turbine 1 is not connected to the electricity supply grid 6, as symbolized by the malfunction arrow 8.

The wind turbine 1 has thus been completely or at least substantially completely erected but not yet connected to the electricity supply grid 6 or has been disconnected from the electricity supply grid 6. In order to then protect the wind turbine 1 from the deposition or penetration of moisture, or to remove moisture from the turbine, the latter can be started up in order to generate power for its own requirements for moisture protection. However, energy is already required in order to start up the wind turbine and this energy cannot be taken from the electricity supply grid because there is no connection to the electricity supply grid 6. For this purpose, the auxiliary generator 2 can be started up and power that is needed to start the wind turbine 1 transferred to the wind turbine 1. Such a connection of the auxiliary generator 2 to the wind turbine 1 is illustrated in FIG. 2 by the switch 10 that is closed to achieve this. The wind turbine can then be started up and its components can be supplied with power by the wind turbine itself, as long as the wind turbine 1 is in the appropriate operating mode. That is, as long as there is suitable wind to maintain operation of the wind power turbine to power its generator. The auxiliary generator 2 can then be switched off again, while the wind turbine 1 continues to run.

Figure 3:
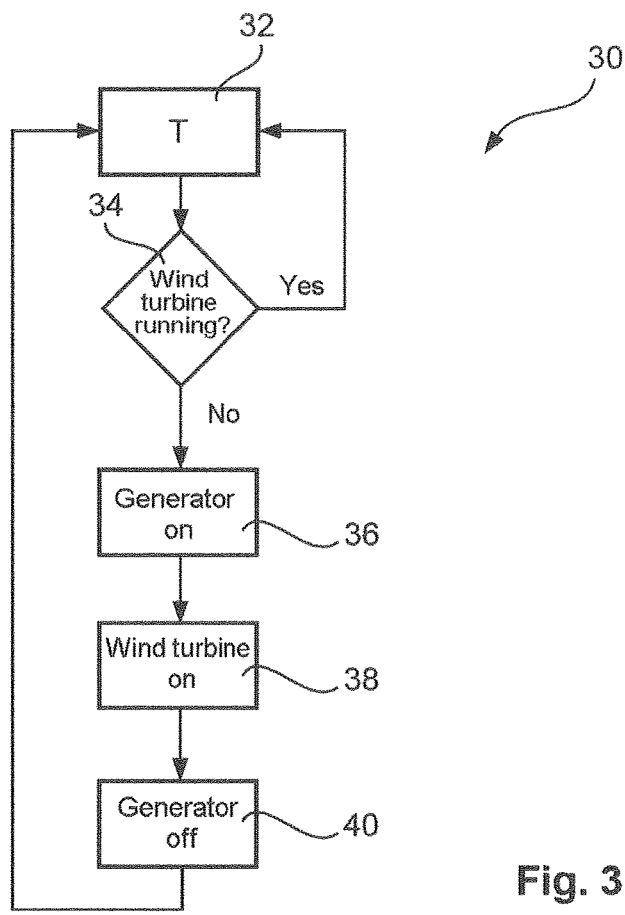
FIG. 3 shows a flow chart to illustrate the sequence of a control method according to an embodiment of the invention.

Such a sequence is explained in the flow chart in FIG. 3. A sequence loop 30 is shown there which is completed at predeterminable checking intervals, i.e., hourly for example.

The predeterminable checking interval, i.e., the time in which the sequence loop 30 is completed, is stored in the control block 32. This control block 32 can also be considered a start block 32. The sequence loop 30 is initiated here each time at the predeterminable checking interval and thus repeated. Once such a predeterminable checking interval or a corresponding waiting time has expired, a query is made in the query block 34 as to whether the wind turbine 1 is running, i.e., is operating and in particular is also generating power, and at least as much power as is required to maintain operation. If this query in the query block 34 is positive, the query block 34 branches back to the control block 32.

If the result of the query in the query block 34 is negative, the wind turbine 1 is therefore not running and so the sequence loop 30 is run through again and the auxiliary generator 2, i.e., the diesel generator 2 in FIG. 2, is initially started up. This is illustrated by the auxiliary generator "on" block 36.

As soon as the auxiliary generator 2 that was switched on in accordance with block 36 and sufficient electrical power can be provided, the wind turbine 1 is switched on, as illustrated by the start-up block 38.

The wind turbine 1 can now accelerate and ultimately maintain its operation itself and generate all the power needed for its operation itself.

Correspondingly, the auxiliary generator 2 can be switched off again, as illustrated by the auxiliary generator "off" block 40. The auxiliary generator 2 is then switched off and there is no need to use any more fuel or other stored energy to operate or to accelerate the wind turbine 1.

If the wind turbine 1 is in operation and the auxiliary generator 2 switched off again, the sequence in the sequence loop 30 reverts to the waiting block 32. Once the waiting time or the predeterminable checking interval has expired, the control block 32 restarts the sequence of the sequence loop 30.

In principle, the wind turbine can now permanently maintain its operation itself, ideally until maintenance staff finally come in order to carry out the outstanding coupling to an electricity supply grid. It may, however, be that in the meantime the wind speed falls so far that the wind turbine can no longer maintain its operation itself, or that faults occur that initially oppose continued operation. The wind turbine then automatically switches off. In particular, rotor blades are turned into the wind, when the wind turbine is shut down and can no longer control such a rotor blade adjustment. It would not be expedient to now start the turbine up again using the auxiliary generator. The wind turbine had ultimately just been operating and should have the moisture removed. Moreover, in all probability the wind turbine could not be maintained in operation when it has just been switched off because of a lack of wind.

For this reason, it is proposed to wait for a period of time before attempting again to start up the turbine. In principle, the waiting period can thus also be selected to be much longer, such as one or more days, for example. Start-up on a daily basis, for example, could be sufficient for removing moisture from or drying the wind turbine. It is, however, problematic when there is no wind at the very time at which start-up is attempted after one day. It is therefore proposed to carry out such an attempt to restart on an hourly basis.

When the restart fails because there is no wind, in particular when the start-up fails many times in a row, according to one embodiment it is proposed to leave the auxiliary generator operating for longer in order to supply at least some components of the wind turbine with electrical power because otherwise there is a risk that moisture is deposited in or penetrates into the wind turbine.

The auxiliary generator can preferably be used to carry out a functional test for many of the components of the wind turbine after it has been erected. If such an auxiliary generator exists, it may possibly be sensible to carry out the functional test when there is little wind.

The present invention thus simply and expediently provides protection against the penetration and/or deposition of moisture for a wind turbine that has been erected but has not yet been connected to an electricity supply grid. Accordingly, turbines are supplied with the self-generated energy, which prevents moisture and corresponding damage, in particular to the electronic components. This is proposed for a wind turbine that is not, in particular not yet, connected to the grid, or also a wind turbine for which a feed-in permit has not yet been granted and thus in any case has not yet been electrically connected to the electricity supply grid. Multiple results should be achieved by such an operation.

A fundamental functionality consists in placing the turbine in a state similar to normal operation, in which the turbine control unit is supplied and the systems, namely the components of the wind turbine, are self-heated. As a result, condensation and high moisture in the wind turbine should be avoided. The moisture can damage electronic and electromechanical components and cause the latter to fail. For example, circuit boards with electronic components that can be functionally affected by moisture and restrict the safety of the turbine are built into the turbine control unit. Many sensors with the purpose of detecting physical variables can be damaged or fail because of the ingress of water.

Another fundamental functionality consists in enabling the turbine to be oriented, i.e., oriented into the wind, by corresponding azimuth adjustment motors. Orienting the wind turbine into the wind can be a prerequisite for preventing water ingress in the vicinity of the nacelle of the wind turbine. The engineering can be developed in order to correspond optimally to normal operation. The engineering basically assumes a correctly operated, in particular correctly oriented wind turbine that generates power. In such normal operation, the turbine faces into the wind so that exterior cladding and sealing systems prevent the ingress of water from this direction. Starting from this position, the sealing of the nacelle may be unfavorable when the wind and rain flow onto it from other directions. The ingress of water can result in damage in the vicinity of the electronic and electromechanical components.

Another fundamental functionality consists in operating the turbine in a state that is similar to normal operation in such a way that the turbine control system is supplied with power, and in testing the functionality of the turbine components, in particular all of the turbine components, including the components required for feeding power in. Thus, during such a phase, the functioning of the corresponding turbine control systems can be tested by maintenance staff and repaired in the event of a fault. Consequently time benefits can be achieved for subsequent start-up if faults can be detected and remedied prior to connection to the grid. Planned maintenance can thus be carried out without connection to the grid and thus reduce the time required for maintenance visits when they are carried out prior to connection to the grid.

The operation of the wind turbine self-heats the interior of the turbine as a result of heat being given off, in particular in the vicinity of the turbine control system, the power generation system, the power transfer system and the feed-in system.

Inside the nacelle, this occurs in the vicinity of the turbine control system where heat is generated by the operation of adjustment motors and the supply of power to control boards. The generator makes a significant contribution to heating up the inside of the nacelle. Losses in the form of heat occur when the rotor torque and the speed are converted into electrical power and the electrical power is transferred to a feed-in unit. Further losses, likewise mainly in the form of heat or which can be converted into heat, occur in components of the power transfer system, in particular in a rectifier where present.

Other elements worthy of note are in the mast of the wind turbine. According to one embodiment, all the feed-in units, in particular inverters, that are accommodated in power cabinets are equipped as standard with a chopper resistor or chopper resistors. For the sake of simplification, a single resistor is assumed here, the purpose of which is namely to convert into heat any energy that is generated during operation by the generator and cannot be fed into the grid. This is used mainly for the functionality of the so-called FRT properties. These are understood to include the property of the wind turbine to be able to continue operating in the event of a fault in the electricity supply grid even when thereby no energy can be discharged into the electricity grid for a short period of time. This energy can be converted into heat by these chopper resistors, while the wind turbine can continue to operate essentially normally otherwise, i.e., apart from feeding in power. This is referred to as a "fault right through" (FRT) property.

A power limit can be detected by measuring an intermediate circuit voltage of a DC intermediate circuit of a corresponding inverter. If this intermediate circuit voltage exceeds a predetermined limit value, the chopper resistor is activated, power is transformed or "killed" accordingly, and a correspondingly set limit is observed. In order to not exceed the thermal capacity of the chopper resistor during this moisture protection operating mode, the chopper resistors that are involved as a whole in a wind turbine can be divided into groups and switched on and off in sequence. Correspondingly, resistors that have heated up can cool down in groups according to such a division in order to regenerate their heat absorption capacity. Such a control system can be monitored, for example, by a corresponding power control circuit board that apart from this performs the task of FACTS power control.

The heat generated as a result can be used in the lower region of the mast, in which the corresponding elements are arranged, in order to increase the ambient temperature and thus prevents condensation on electronic components.

The moisture protection operating mode described can also be referred to as "self-supply mode". It serves to supply the turbine with its own power and if possible all the turbine parts are supplied with voltage, including the heaters in the switch cabinets. It thus serves to prevent damage to electrical components due to extended down time of the wind turbine. This self-supply mode thus serves to supply the turbine with its own power and the turbine is thus in a normal operating mode but without supply from the grid. In these circumstances, the wind turbine works independently and generates only as much energy and power as it consumes itself.

If possible all the turbine parts are supplied with voltage. Thus the heaters in the switch cabinets function too and the generator is warmed up as well, namely the generator of the wind turbine, which should not be confused with the separate auxiliary generator that was mentioned in connection with FIG. 2 as being, for example, a diesel generator. If this self-supply mode is activated, the cost of keeping the wind turbine operating can rise too because, for example when there is a lack of wind or a fault in the wind turbine, the turbine must be restarted using an electricity producer such as the said auxiliary generator.

For example, wind turbines can be started using a relatively small emergency power unit with, for example, 11 kW or more power. These turbines remain operating with a maximum power of approximately 30 kW until they are stopped again and switched off because of a lack of wind or another event or status.

According to one embodiment, a switching means is provided that can be situated in a switching cabinet that is connected to an emergency power distribution system and supplies the turbine control system of the wind turbine with voltage from the electricity supply grid via a switch. In contrast to other embodiments described above, in this respect a functioning grid connection would initially exist. When the grid voltage fails, the connection to the control chain is broken and, when the voltage returns, in particular when a corresponding problem in the electricity supply grid has been remedied, the grid voltage is switched back on. A connection is also made to a diesel generator or diesel motor that can also be provided as a central diesel motor for multiple wind turbines. There is consequently a switch between grid supply and auxiliary supply and thus a switch between the electricity supply grid and the diesel motor. Moreover, a manual switch-off device with a circuit breaker can be provided. A superordinate control system is additionally provided that contains an output interface for communicating with other elements of the wind turbine. Communication with the so-called Scada system for exchanging management-related data can also be effected. The supply can correspondingly be switched via the electricity supply grid or the diesel motor mentioned by way of example via such an input/output interface. Supply via the electricity supply grid can be provided when, although the wind turbine has already been connected to the grid, it has not yet been made ready or approved for feeding in power.

It is also proposed to provide for the turbine control system an uninterrupted supply of electricity that is usually also referred to as a USV. This can also be used for the self-supply mode. This USV supplies the turbine control system, i.e., the control system of the wind turbine, with voltage in the event of a temporary grid failure and is thus also proposed for the self-supply mode in which the USV can also supply the turbine control system with voltage without switching off the wind turbine. As an energy store, the USV does not use any additional batteries, even if that were possible, that need to be replaced regularly, and instead uses the DC intermediate circuit of the corresponding inverters of the turbine control system as an energy store.

Figure 4:
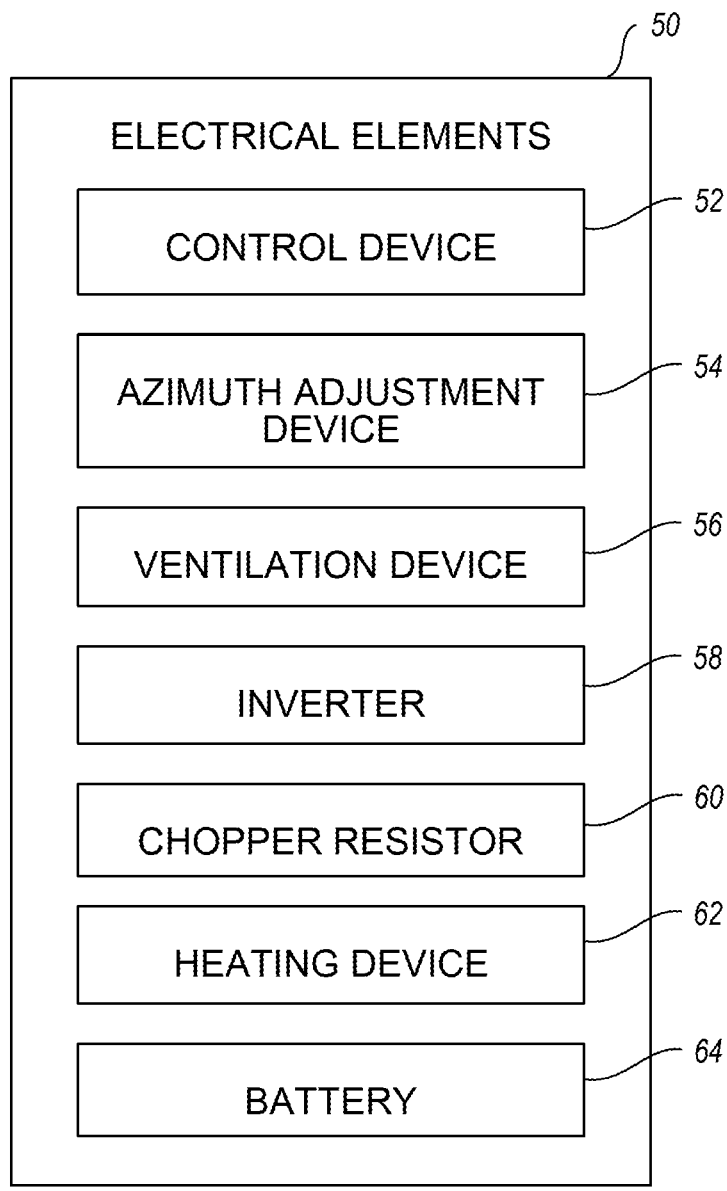
FIG. 4 is a block diagram of electrical elements.

FIG. 4 is a block diagram showing the electrical elements 50, which may include a control device 52, an azimuth adjustment device 54, a ventilation device 56, an inverter 58, a chopper resistor 60, a heating device 62 and a battery 64.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

operating a wind turbine in a moisture protection operating mode while the wind turbine is not connected to an electricity supply grid, the moisture protection operating mode being a mode of operation of the wind turbine for protecting the wind turbine from moisture that is at least one of: moisture deposited on or moisture penetrating the wind turbine while the wind turbine is not connected to the electricity supply grid, the wind turbine comprising a generator configured to:

generate electrical power, supply the generated electrical power to electrical elements of the wind turbine when the wind turbine is not connected to the electricity supply grid, and feed the generated electrical power into the electricity supply grid when the wind turbine is connected to the electricity supply grid, and repeatedly performing a sequence loop including:

waiting until a waiting time has expired;

determining whether the generator is operating and generating the electrical power;

if the generator is generating the electrical power, supplying the electrical elements of the wind turbine with the generated electrical power; and if the generator is not generating the electrical power, switching on an auxiliary energy source for supplying electrical power to the electrical elements of the wind turbine and for starting the wind turbine in the moisture protection operating mode.

2. The method according to claim 1, wherein the electrical elements comprise at least one of:

a control device for controlling the wind turbine;

an azimuth adjustment device for adjusting an orientation of the wind turbine relative to a wind direction;

a heating device for heating a part of the wind turbine;

a ventilation device for ventilating at least one part of the wind turbine;

an inverter for feeding in the generated electrical power into the electricity supply grid; and a chopper resistor for converting the generated electrical power into heat.

3. The method according to claim 1, further comprising after starting the wind turbine, at least one of: disconnecting an auxiliary energy source from the wind turbine or powering off the auxiliary energy source, wherein, after starting, the wind turbine is configured to supply at least a portion of the generated electrical power to the electrical elements of the wind turbine.

4. The method according to claim 1, further comprising temporarily supplying at least one of the electrical elements with electrical power from the auxiliary energy source when there is insufficient wind to maintain operation of the wind turbine.

5. The method according to claim 4, wherein the auxiliary energy source is at least one of a battery, an auxiliary generator, and an auxiliary diesel generator.

6. The method according to claim 4, further comprising:

decoupling the wind turbine from the auxiliary energy source; and after a particular amount of time, determining whether the wind turbine is still operating.

7. The method of claim 6, wherein decoupling the wind turbine from the auxiliary energy source comprises powering down the auxiliary energy source.

8. The method according to claim 1 further comprising:

after a predetermined period of time has elapsed, determining whether there is sufficient wind to maintain operation of the wind turbine; and in response to determining there is insufficient wind, powering off at least one of the generator and the supply of the generated electrical power to the electrical elements.

* * * * *